(12) United States Patent
Lin et al.

(10) Patent No.: US 7,802,908 B2
(45) Date of Patent: Sep. 28, 2010

(54) LIGHT GUIDE MODULE AND A DISPLAY DEVICE WITH THE LIGHT GUIDE MODULE

(75) Inventors: Hui-Ling Lin, Gukeng Township, Yunlin County (TW); Chang-Hung Pan, Sijhih (TW)

(73) Assignees: Silitek Electronic (Guangzhou) Co., Ltd., Guangzhou (CN); Lite-On Technology Corporation, Taipei (TW)

( * ) Notice: Subject to any disclaimer, the term of this patent is extended or adjusted under 35 U.S.C. 154(b) by 175 days.

(21) Appl. No.: 12/155,865

(22) Filed: Jun. 11, 2008

(65) Prior Publication Data

US 2009/0231882 A1    Sep. 17, 2009

(30) Foreign Application Priority Data

Mar. 14, 2008    (CN) .................. 2008 1 0026842

(51) Int. Cl.
*F21V 7/04* (2006.01)
*F21V 5/00* (2006.01)

(52) U.S. Cl. .................. 362/559; 362/616; 362/618; 362/604; 362/601

(58) Field of Classification Search .................. 362/615, 362/616, 618, 612, 613, 559, 604, 601
See application file for complete search history.

(56) References Cited

U.S. PATENT DOCUMENTS

| | | | | |
|---|---|---|---|---|
| 5,027,258 A | * | 6/1991 | Schoniger et al. | 362/629 |
| 5,283,968 A | * | 2/1994 | Williams | 40/546 |
| 6,648,486 B2 | * | 11/2003 | Harbers et al. | 362/613 |
| 7,246,932 B2 | * | 7/2007 | Burtsev et al. | 362/616 |
| 7,537,369 B2 | * | 5/2009 | Takata | 362/606 |
| 2003/0184990 A1 | * | 10/2003 | Lin | 362/31 |
| 2009/0073721 A1 | * | 3/2009 | Kamikatano et al. | 362/616 |
| 2009/0141512 A1 | * | 6/2009 | Eberwein | 362/497 |
| 2009/0219734 A1 | * | 9/2009 | Sawada et al. | 362/616 |

FOREIGN PATENT DOCUMENTS

CN        20060134520.2        10/2007

* cited by examiner

*Primary Examiner*—Jacob Y Choi
(74) *Attorney, Agent, or Firm*—Rosenberg, Klein & Lee

(57) ABSTRACT

A light guide module and a display device with the light guide module are disclosed. The light guide module includes a rigid light guide film and a soft light guide film. The soft light guide film is pasted on the rigid light guide film. The soft light guide film has a first surface, and a pattern is formed on the first surface. The area of the first surface without the pattern is pasted on the rigid light guide film. The pattern is positioned between the soft light guide film and the rigid light guide film. The display device includes at least one light guide module and a light source located at one side of the light guide module. When the light source is on, the pattern is lit and visible.

4 Claims, 2 Drawing Sheets

LIGHT GUIDE MODULE AND A DISPLAY DEVICE WITH THE LIGHT GUIDE MODULE

BACKGROUND OF THE INVENTION

1. Field of the Invention

The present invention relates to a light guide module. In particular, the present invention relates to a light guide module that can directly display an image while under a light source that is shining and a display device with the light guide module.

2. Description of the Related Art

In order to enhance the appearance and easily display images in computer, consumer, and communication products (3C products), a compact screen is usually located on the housing. In addition to providing colorful lights, the compact screen can also display the time, the operation status, and the functional mode of the products. Thereby, the characteristic of the 3C products are enhanced.

The compact screen usually is an LCD. However, the structure of LCDs is complex, and their cost is high. Therefore an LCD is not suitable for mere appearance enhancement due to high cost, and not suitable for easy image display on the 3C products due to complex structure. In order to solve this problem, LEDs are adopted, such as People's Republic of China patent, 200620134520. It controls the LED matrix via a cell phone to display the time, incoming phone call status, and other simple information. However, because the quantity of the LED matrix pattern elements tends to be few, which would result in low resolution, so that the displayed image is not clear, and the brightness distribution is uneven. Furthermore, the dimension of the LED matrix tends to be large so that it is not suitable for thin and miniaturized 3C products.

Whether in the control area used for input, the lighted area used for decoration, or the function display area used for status indication, a backlight module with a light guide module is adopted to provide the backlight to shine the control area, directly display patterns to enhance the decorations, or directly display the function mode via a default pattern, etc.

In the backlight source, the light guide film is a polycarbonate (PC) film or a silicone film. The PC film is rigid and its brightness is uniform. However, the PC film is not easy to process, and its texture is not pleasant to the touch. On the other hand, the silicone film can overcome the above PC film limitations, because it is soft and easy to process, furthermore the resulting silicone film has a pleasant texture to the touch. However, silicone film is adhesive. Therefore when the silicone film is pasted on the reflection board, will result in uneven contact surface formed by molecules sticking together, and a large amount of light will scatter outside the light guide layer due to this uneven surface reflection, resulting in reduced and inadequate brightness.

SUMMARY OF THE INVENTION

One particular aspect of the present invention is to provide a light guide module, with uniform and adequate brightness, and the light guide module, specifically the part that determines the light pattern and needs to be altered often to suit various products, can be easily processed according to the present invention.

Another particular aspect of the present invention is to provide a display device with a light guide module with uniform and adequate brightness, and can be easily processed.

The light guide module includes a rigid light guide film and a soft light guide film. The soft light guide film is pasted on the rigid light guide film. The soft light guide film has a first surface, and a pattern is formed on the first surface. The area of the first surface without the pattern is pasted on the rigid light guide film. The pattern is positioned between the soft light guide film and the rigid light guide film.

The pattern is composed of a plurality of convex points that has the same material as the soft light guide film. Alternatively, the pattern also can be composed of a plurality of concave marks formed on the first surface of the soft light guide film.

Another particular aspect of the present invention is to provide a display device. The display device includes a light guide module and at least one light source located at one side of the light guide module. The light guide module includes a rigid light guide film and a soft light guide film. The soft light guide film has a first surface, and a pattern is formed on the first surface. The area of the first surface without the pattern is pasted on the rigid light guide film. The pattern is positioned between the soft light guide film and the rigid light guide film. When the light source is on, the pattern is lit and is visible.

The present invention also provides a display device. The display device includes a first light guide module and a second light guide module, and each of the first light guide module and the second light guide module has at least one light source. The light sources are respectively located at one side of the matched light guide module. In other words, one light source would be to one side of the first light guide module, another light source would be to one side of the second light guide module, and the first and second light guide module are identical with the possible exception of their respective patterns formed within. Each of the first light guide module and the second light guide module has a rigid light guide film and a soft light guide film. The soft light guide film has a first surface, and a pattern is formed on the first surface. The area of the first surface without the pattern is pasted on the rigid light guide film. The pattern is positioned between the soft light guide film and the rigid light guide film. The first light guide module and the second light guide module are stacked orderly. There is a gap between the rigid light guide film of the first light guide module and the soft light guide film of the second light guide module. When the light sources are on, the patterns on the first light guide module and the second light guide module are lit and are visible.

In one embodiment, the second light guide module further includes a reflection plate, which functions like a simple reflector in a backlight diffuser, that guides otherwise wasted light that would be scattered back towards the intended lighting area. The reflection plate is pasted on the rigid light guide film of the second light guide module so that the rigid light guide film is positioned between the reflection plate and the soft light guide film.

Because the light guide module includes a rigid light guide film and a soft light guide film, the pattern is formed on the soft light guide film and the rigid light guide film can be combined with the reflection plate, the light guide module has the characteristics of the soft light guide film being easily processed, hence different pattern can be easily processed; and the rigid light guide film being non-adhesive, hence no excess molecular bond would form resulting from adhesiveness, thus no uneven surface would form, and less light will be scatter outside the intended lighting area since light will reflect off even surface. When the light guide module is applied to the display device, the display device can directly display the pattern; therefore brightness will be uniform and adequate. Furthermore, comparing to the LCD, the structure of the display device of the present invention is simple, and its cost is low. Comparing to LED matrix display, the display device of the present invention meets the requirement of computer, consumer and communication products (3C products) which aims to be ever lighter and miniaturized in this fast paced market.

For further understanding of the invention, reference is made to the following detailed description illustrating the embodiments and examples of the invention. The description is for illustrative purpose only and is not intended to limit the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
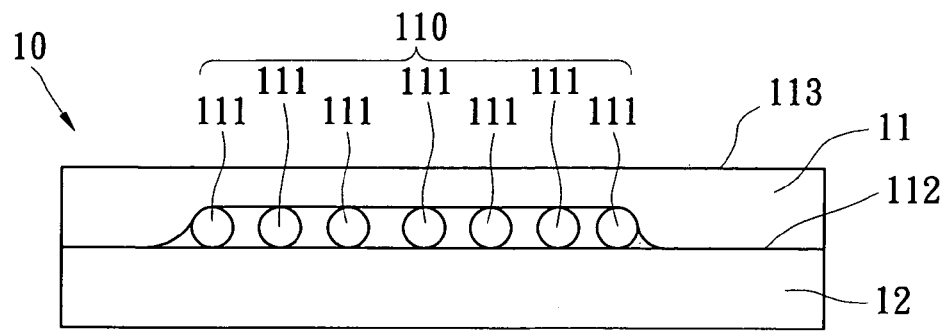
FIG. 1 is a schematic diagram of the light guide module of the first embodiment of the present invention.

Reference is made to FIG. 1, which shows the first embodiment of the present invention. The light guide module 10 includes a light guide film 11 and a light guide film 12. The light guide film 11 is composed of a soft material, such as silicone. The light guide film 12 is composed of a rigid material, such as polycarbonate (PC). There is a plurality of convex points 111 on the first surface 112 of the light guide film 11, and the convex points 111 are disposed to form a pattern 110. The light guide film 11 is pasted on the surface of the light guide film 12. The pattern 110 on the first surface 112 of the light guide film 11 is positioned between the light guide film 11 and the light guide film 12.

Figure 2:
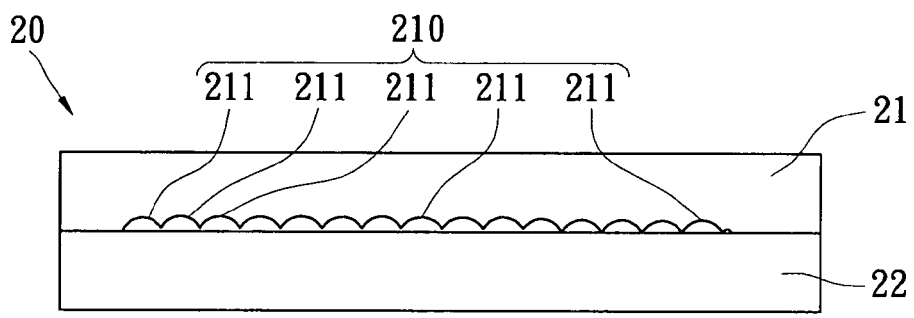
FIG. 2 is a schematic diagram of the light guide module of the second embodiment of the present invention.

Reference is made to FIG. 2, which shows the second embodiment of the present invention. The structure of the light guide module 20 is the same as the light guide module 10, and includes a soft light guide film 21 and a rigid light guide film 22. The difference between the second embodiment and the first embodiment is that the pattern 210 is composed of concave marks 211.

Figure 3:
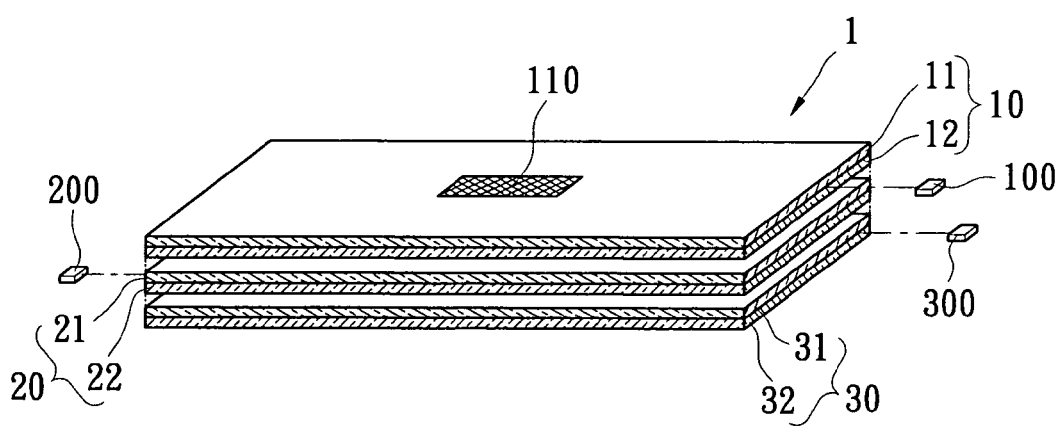
FIG. 3 is a schematic diagram of the display device with three light guide modules of the present invention.

Because the soft light guide films 11, 21 can easily be processed to form the patterns and the rigid light guide films 12, 22 do not have the adhesive problem, which leads to light scatter, so that when the rigid light guide films 12, 22 are combined with the reflection plates, the light guide modules 10, 20 have the characteristics of the soft light guide film being easily processed and the rigid light guide film being not adhesive, which leading to less light scatter. Furthermore, no matter the convex points 111 or the concave marks 211, there is a gap between the light guide films. Therein the reflection plates functions like a simple reflector in a backlight diffuser, that guides otherwise wasted light that would be scattered back towards the intended lighting area. As shown in FIG. 3, by cooperating with the light beam provided by the light sources 100, 200, and 300 that shines in from the light guide film gap, wherein the gap (having either air medium or being vacuum) along with the light source are used for generating a delaminated and independent display effect. Please realize the gap between light guide modules [i.e. 10 and 20] is even more pronounced which is apparent from FIGS. 3 and 4, and should not be confused with the gap between light guide films that is mentioned above [i.e. 11 and 12]

Figure 4:
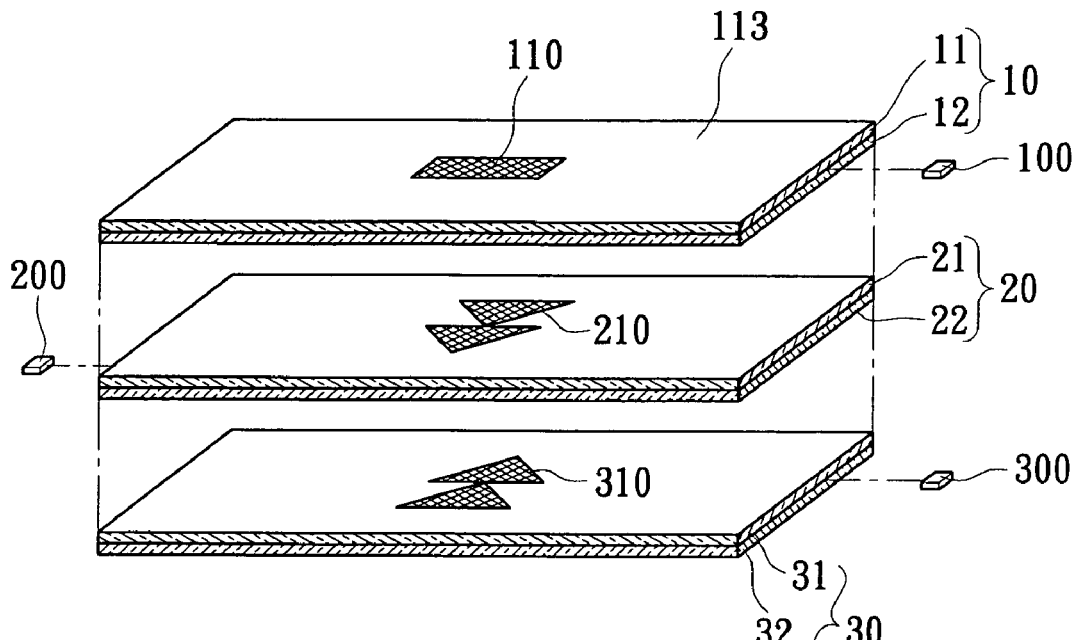
FIG. 4 is an exploded perspective view of the display device in FIG. 3.
Figure 5:
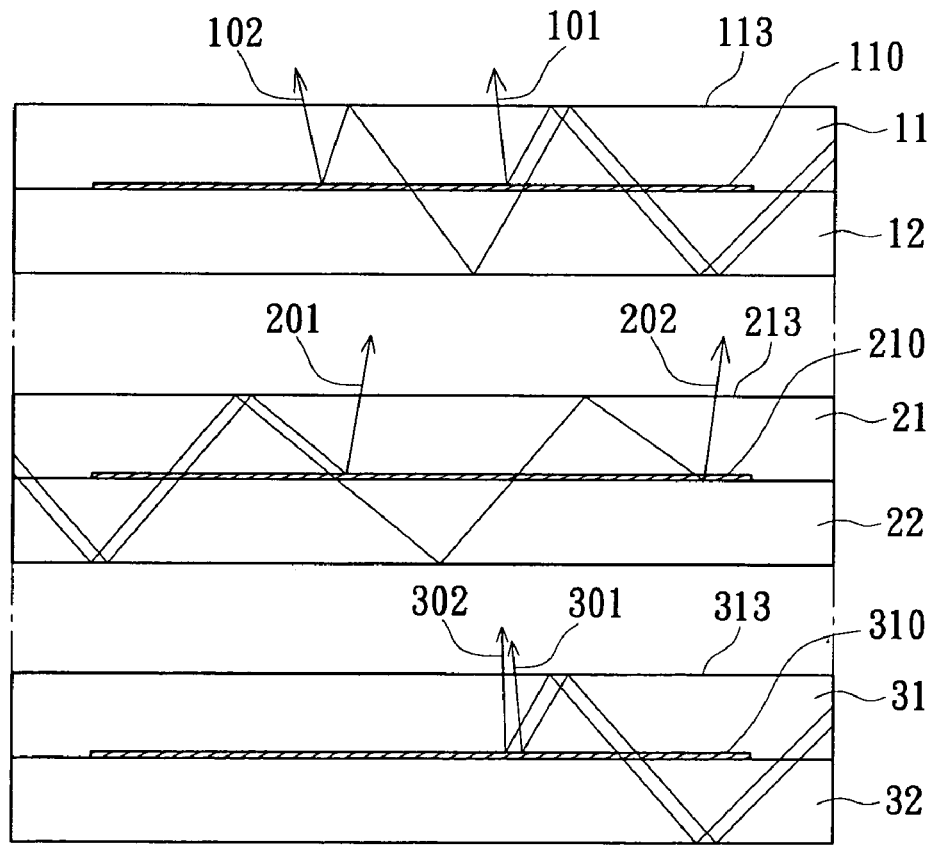
FIG. 5 is a schematic diagram of the display principle of the display device in FIG. 3.

The light guide modules 10, 20 can be applied to the display device. Reference is made to FIGS. 3 and 5. A display device 1 includes the light guide modules 10, 20, 30 that are stacked. The light guide module 30 is the same as the light guide modules 10, 20, and includes a soft light guide film 31 and a rigid light guide film 32. The surface contacted by the soft light guide film 31 and the rigid light guide film 32 forms a pattern 310. The light guide modules 10, 20, 30 are orderly stacked. This means that the rigid light guide film 12 of the light guide module 10 is adjacent to the soft light guide film 21 of the light guide module 20, and the rigid light guide film 22 of the light guide module 20 is adjacent to the soft light guide film 31 of the light guide module 30, as shown in FIG. 4. In order to provide a display effect, one side of each of the light guide modules 10, 20, 30 is respectively located with a light source 100, 200, or 300.

Please view in conjunction with FIGS. 3 and 5. When the light source 100 is on, part of light beam of the light source 100 is emitted into the light guide module 10 in a specified angle. When light beam is emitted to the area of light guide module 10 that has no pattern 110, and emitted with an incident angel of the light beam larger than the critical angle of the light guide material, then the light beam will be totally reflected and emitted to the outside of the light guide module 10, and in such a way that the light source 100 will be reflected from one end of the light guide module 10 and emitted out from opposite end of the light guide module 10. Because the pattern 110 in the light guide module 10 has convex points or concave marks, the surface is not smooth and uniform. Therefore, the light beam of the light source is diffusely reflected, generating scattered light. As shown in FIG. 5, when part 101, 102 of light beams are emitted by reflection (please note, emitted in the present invention means emitted by reflection unless talking about a light source, since technically only a light source can truly produce and emit light) to the air from the light guide film 11 and the incident angle is smaller than the critical angle of the light guide film 11, then part 101, 102 of light beams are emitted by reflection from the second surface 113 of the light guide film 11 so that the pattern 110 is visible on the second surface 113.

Similarly, view in conjunction with FIGS. 3 and 5 when the light source 200 is on and the incident angle of the light beams 201, 202 is smaller than the critical angle of the light guide film 21, the light beams 201, 202 are emitted by reflection from the surface 213 of the light guide film 21 so that the pattern 210 is shown on the surface 213 of the light guide film 21. When the light source 300 is on and the incident angle of the light beams 301, 302 is smaller than the critical angle of the light guide film 31, the light beams 301, 302 are emitted by reflection from the surface 313 of the light guide film 31 so that the pattern 310 is shown on the surface 313 of the light guide film 31.

Because the incident angle of the light beams 201, 202 emitting out by reflection from the surface 213 of the light guide film 21 is smaller than the critical angle of the light guide film 21 and is also smaller than the critical angle of the light guide module 10 with the same material, therefore these light beams can pass through the light guide module 10 and emit by reflection out from the second surface 113 of the light guide film 11. Thus, the user can see the pattern 210 from the second surface 113. Similarly, the user can see the pattern 310 from the second surface 113.

Because there is a gap between the light guide modules 10, 20, 30 (either air medium or vacuum which separates the two adjacent light guide modules), each of the light guide modules can independently display the pattern according to the principle for the light guide module displaying the pattern 110. Therefore, when the light sources 100, 200, 300 are on, the user can see the patterns 110, 210, 310 from the second surface 113, and the patterns do not interfere with each other.

In order to enhance the brightness of the patterns 210, 310 on the second surface 113, the illumination of the light sources 200, 300 can be increased to compensate the light loss when the light beams of the patterns 210, 310 pass through the light guide module 10 or the light guide module 20.

Furthermore, in order to decrease the light loss, a reflection plate (not shown in the figure, but functions like a simple reflector in a backlight diffuser, that guides otherwise wasted light that would be scattered back towards the intended lighting area) is located on a surface of the rigid light guide film 32 of the light guide module 30 that is opposite to the soft light guide film 31 so that the rigid light guide film 32 is positioned between the reflection plate and the soft light guide film 31. The reflection plate can reflect the light beams with a small incident angle that cannot be totally reflected to the light guide module 30.

The patterns 110, 210, 310 can be designed as figures or texts with versatile shape to provide a decoration effect or a displaying effect.

The light sources 100, 200, 300 can be LED lamps, and their color can vary to enhance the appearance of the display device 1.

The display device can be applied to the screen on the housing of computer, consumer and communication products (3C products) or to the function screen of the household electric appliances.

Comparing to the LCD, the structure of the display device of the present invention is simple, and its cost is low. Comparing to LED matrix display, the display device of the present invention meets the requirements of computer, consumer and communication (3C) products which aims to be ever lighter and miniaturized in this fast paced market. Comparing to the backlight of the prior art, the light guide film of the display device of the present invention has the characteristics of the rigid light guide film being non-adhesive, which leads to less light will be scatter outside the intended lighting area, and the soft light guide film being easily processed. Furthermore, by using the light guide module, the display device can directly display the pattern, and the brightness will be uniform and adequate.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A display device, comprising:
a first light guide module; and
a second light guide module;
wherein each of the two light guide modules has at least one light source, and the light sources are respectively located at one side of the light guide module;
wherein the first light guide module and the second light guide module each has a rigid light guide film and a soft light guide film, the soft light guide film has a first surface, a pattern is formed on the first surface, an area of the first surface without the pattern is pasted onto the rigid light guide film, the pattern is positioned between the soft light guide film and the rigid light guide film, the first light guide module and the second light guide module are stacked orderly, there is a gap between the rigid light guide film of the first light guide module and the soft light guide film of the second light guide module, and the patterns on the first light guide module and the second light guide module are lit and are visible when the light sources are on.

2. The display device as claimed in claim 1, wherein the pattern is composed of a plurality of convex points and the material of which is the same as that of the soft light guide film, or composed of a plurality of concave marks formed on the first surface of the soft light guide film.

3. The display device as claimed in claim 1, wherein the illumination of the light source for the second light guide module is larger than the illumination of the light source for the first light guide module.

4. The display device as claimed in claim 1, wherein the second light guide module further comprises a reflection plate, and the reflection plate is pasted onto the rigid light guide film of the second light guide module so that the rigid light guide film is positioned between the reflection plate and the soft light guide film.

* * * * *